US011329503B2

(12) United States Patent
Hayashi

(10) Patent No.: US 11,329,503 B2
(45) Date of Patent: May 10, 2022

(54) SYNCHRONIZATION CONTROL CIRCUIT AND UNINTERRUPTIBLE POWER SUPPLY APPARATUS INCLUDING THE SAME

(71) Applicant: TOSHIBA MITSUBISHI-ELECTRIC INDUSTRIAL SYSTEMS CORPORATION, Chuo-ku (JP)

(72) Inventor: Yousuke Hayashi, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 17/291,722

(22) PCT Filed: Jul. 4, 2019

(86) PCT No.: PCT/JP2019/026652
§ 371 (c)(1),
(2) Date: May 6, 2021

(87) PCT Pub. No.: WO2021/001994
PCT Pub. Date: Jan. 7, 2021

(65) Prior Publication Data
US 2021/0328455 A1    Oct. 21, 2021

(51) Int. Cl.
*H02J 9/00*    (2006.01)
*H02J 9/06*    (2006.01)
*H02J 3/40*    (2006.01)

(52) U.S. Cl.
CPC ............... *H02J 9/062* (2013.01); *H02J 3/40* (2013.01); *H02J 9/068* (2020.01)

(58) Field of Classification Search
CPC .... H02J 9/062; H02J 9/068; H02J 9/00; H02J 3/40
See application file for complete search history.

(56) References Cited

U.S. PATENT DOCUMENTS

2003/0052544 A1 *   3/2003   Yamamoto ............ B66B 5/0018
                                                        307/66

FOREIGN PATENT DOCUMENTS

| JP | 11-89217 A | | 3/1999 |
| JP | 11089217 A | * | 3/1999 |
| JP | 2007-274766 A | | 10/2007 |

OTHER PUBLICATIONS

International Search Report dated Sep. 24, 2019 in PCT/JP2019/026652 filed Jul. 4, 2019, 1 page.

* cited by examiner

*Primary Examiner* — Rexford N Barnie
*Assistant Examiner* — Rasem Mourad
(74) *Attorney, Agent, or Firm* — Oblon, McClelland, Maier & Neustadt, L.L.P.

(57) ABSTRACT

A synchronization control circuit transforms a three-phase AC voltage supplied from a commercial AC power supply to a vector on rotational coordinates and calculates a first phase difference between the vector and a d axis. When magnitude of the first phase difference is larger than a prescribed value, the synchronization control circuit sets the first phase difference as it is as a second phase difference. When magnitude of the first phase difference is smaller than the prescribed value, the synchronization control circuit generates the second phase difference in reverse polarity to the first phase difference, and controls a frequency of a clock signal so as to set the second phase difference to 0 degree.

8 Claims, 11 Drawing Sheets

FIG.12

CONDITION[1]

| VEn | VEp |
|---|---|
| Q6 | Q7,Q8,Q1,Q2,OR Q3 |
| Q7 | Q8,Q1,Q2,OR Q3 |
| Q8 | Q1,Q2,OR Q3 |

FIG.13

CONDITION[4]

| VEn | VEp |
|---|---|
| Q3 | Q2,Q1,Q8,Q7,OR Q6 |
| Q2 | Q1,Q8,Q7,OR Q6 |
| Q1 | Q8,Q7,OR Q6 |

SYNCHRONIZATION CONTROL CIRCUIT AND UNINTERRUPTIBLE POWER SUPPLY APPARATUS INCLUDING THE SAME

TECHNICAL FIELD

This invention relates to a synchronization control circuit and an uninterruptible power supply apparatus including the same and particularly to a synchronization control circuit that generates phase information in phase with a three-phase alternating-current (AC) signal and an uninterruptible power supply apparatus including the same.

BACKGROUND ART

For example, Japanese Patent Laying-Open No. 11-089217 (PTL 1) and Japanese Patent Laying-Open No. 2007-274766 (PTL 2) each disclose a synchronization control circuit including a clock generator that generates a clock signal having a variable frequency, a phase generator that advances phase information by a prescribed angle in response to each pulse in the clock signal, a coordinate transformer that transforms, in response to each pulse in the clock signal, a three-phase AC signal to a vector on rotational coordinates with the phase information being defined as the reference, and a controller that controls a frequency of the clock signal so as to eliminate a phase difference between the vector and a reference axis of the rotational coordinates.

CITATION LIST

Patent Literature

PTL 1: Japanese Patent Laying-Open No. 11-089217
PTL 2: Japanese Patent Laying-Open No. 2007-274766

SUMMARY OF INVENTION

Technical Problem

In PTLs 1 and 2, however, disadvantageously, when a vector is advanced in phase, a frequency of the clock signal is increased, and when the vector is delayed in phase, the frequency of the clock signal is lowered, and hence the frequency of the clock signal fluctuates and phase information cannot quickly be synchronized with the three-phase AC signal.

Therefore, a primary object of this invention is to provide a synchronization control circuit capable of quickly synchronizing phase information with a three-phase AC signal and an uninterruptible power supply apparatus including the same.

Solution to Problem

A synchronization control circuit according to this invention is a synchronization control circuit that generates phase information in phase with a three-phase AC signal, and the synchronization control circuit includes a clock generator, a phase generator, a coordinate transformer, a calculator, a phase corrector, and a controller. The clock generator generates a clock signal having a variable frequency. The phase generator advances the phase information by a predetermined angle in response to each pulse in the clock signal. The coordinate transformer transforms, in response to each pulse in the clock signal, the three-phase AC signal to a vector on rotational coordinates with the phase information being defined as a reference. The calculator calculates a first phase difference between the vector and a reference axis of the rotational coordinates. The phase corrector corrects the first phase difference to generate a second phase difference. The controller controls a frequency of the clock signal so as to eliminate the second phase difference. When magnitude of the first phase difference is larger than a predetermined value, the phase corrector sets the first phase difference as it is as the second phase difference. When magnitude of the first phase difference is smaller than the predetermined value, the phase corrector generates the second phase difference in reverse polarity to the first phase difference.

Advantageous Effects of Invention

The synchronization control circuit according to this invention calculates the first phase difference between the vector and the reference axis of the rotational coordinates. When magnitude of the first phase difference is larger than the prescribed value, the synchronization control circuit sets the first phase difference as it is as the second phase difference, and when magnitude of the first phase difference is smaller than the prescribed value, the synchronization control circuit generates the second phase difference reverse in polarity to the first phase difference and controls the frequency of the clock signal so as to eliminate the second phase difference. Therefore, fluctuation of the frequency of the clock signal can be prevented and the phase information can quickly be synchronized with the three-phase AC signal.

BRIEF DESCRIPTION OF DRAWINGS

FIG. 12 is a diagram showing a condition [1] shown in FIG. 10.

FIG. 13 is a diagram showing a condition [4] shown in FIG. 11.

DESCRIPTION OF EMBODIMENTS

Figure 1:
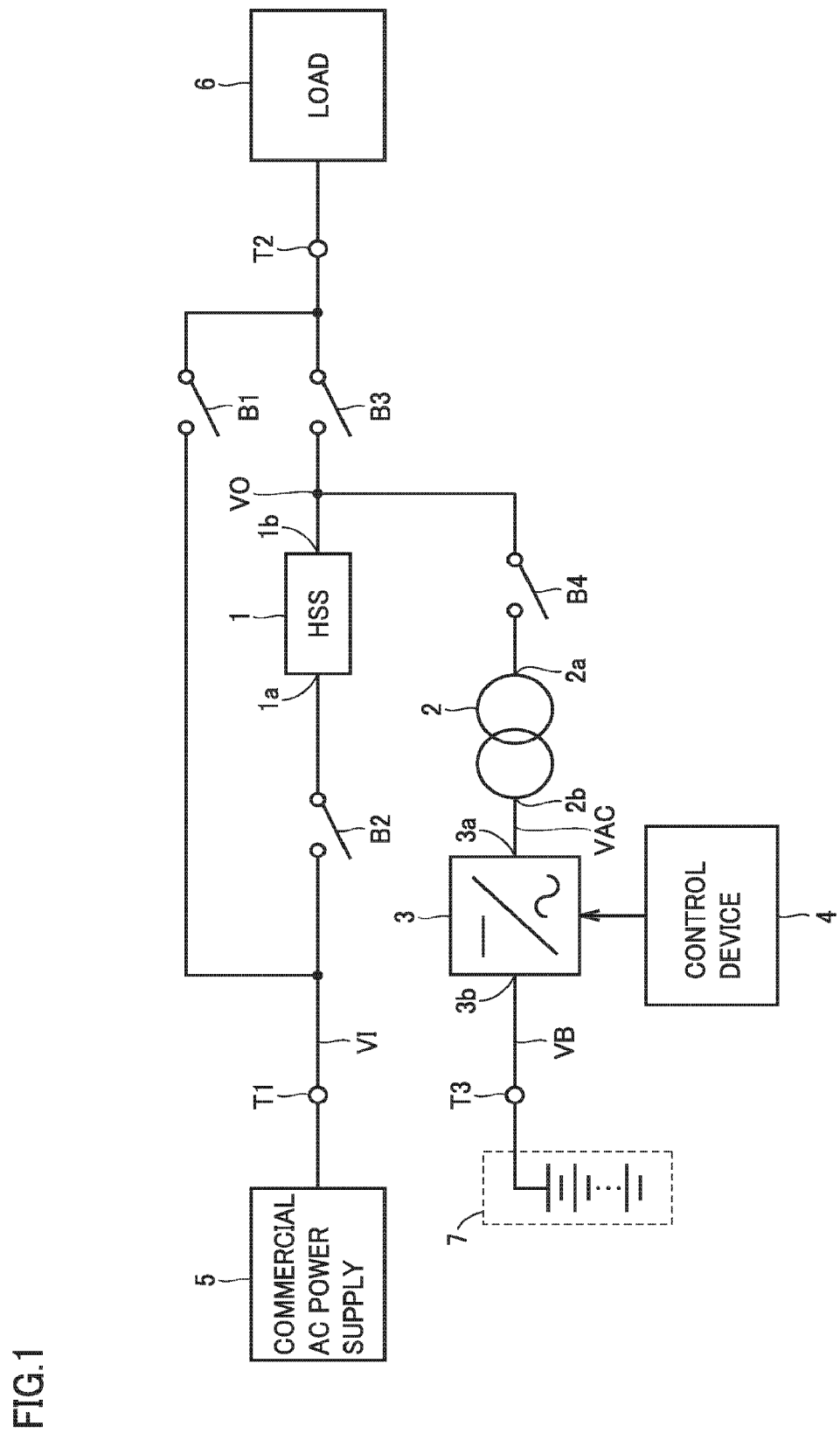
FIG. 1 is a circuit block diagram showing a configuration of an uninterruptible power supply apparatus according to an embodiment.

FIG. 1 is a circuit block diagram showing a configuration of an uninterruptible power supply apparatus according to one embodiment of this invention. This uninterruptible power supply apparatus supplies a three-phase AC voltage supplied from a commercial AC power supply 5 or a bidirectional converter 3 to a load 6. For the sake of brevity of the drawings and description, FIG. 1 shows only a portion relating to one phase. This uninterruptible power supply apparatus is also called a multiple power compensator.

In FIG. 1, this uninterruptible power supply apparatus includes an input terminal T1, an output terminal T2, a battery terminal T3, breakers B1 to B4, a high-speed switch (HSS) 1, a transformer 2, bidirectional converter 3, and a control device 4.

Input terminal T1 receives an AC voltage VI at a commercial frequency supplied from commercial AC power supply 5. An instantaneous value of AC voltage VI is detected by control device 4. Output terminal T2 is connected to load 6. Load 6 is driven by an AC voltage supplied from the uninterruptible power supply apparatus. Battery terminal T3 is connected to a battery 7 (power storage device). Battery 7 stores direct-current (DC) power. A capacitor may be connected instead of battery 7. A voltage VB across terminals of battery 7 is detected by control device 4.

Breaker B1 is connected between input terminal T1 and output terminal T2. When the uninterruptible power supply apparatus is used, breaker B1 is turned off. During maintenance of the uninterruptible power supply apparatus, breaker B1 is turned on and AC voltage VI from commercial AC power supply 5 is supplied to load 6 through breaker B1.

Breaker B2 is connected between input terminal T1 and one terminal 1*a* of high-speed switch 1. Breaker B3 is connected between the other terminal 1*b* of high-speed switch 1 and output terminal T2. When the uninterruptible power supply apparatus is used, breakers B2 and B3 are turned on. During maintenance of the uninterruptible power supply apparatus, breakers B2 and B3 are turned off.

High-speed switch 1 is implemented, for example, by a semiconductor switching element, and controlled by control device 4. While commercial AC power supply 5 is normal, high-speed switch 1 is turned on so that AC voltage VI from commercial AC power supply 5 is supplied to load 6 through breaker B2, high-speed switch 1, and breaker B3. When commercial AC power supply 5 fails, high-speed switch 1 is turned off to electrically disconnect commercial AC power supply 5 and load 6 from each other. An instantaneous value of an AC voltage VO that appears at the other terminal 1*b* of high-speed switch 1 is detected by control device 4.

Breaker B4 is connected between the other terminal 1*b* of high-speed switch 1 and a primary winding 2*a* of transformer 2. When the uninterruptible power supply apparatus is used, breaker B4 is turned on. During maintenance of the uninterruptible power supply apparatus, breaker B4 is turned off. A secondary winding 2*b* of transformer 2 is connected to an AC terminal 3*a* of bidirectional converter 3. Transformer 2 supplies and receives AC power between the other terminal 1*b* of high-speed switch 1 and bidirectional converter 3.

Bidirectional converter 3 has a DC terminal 3*b* connected to battery terminal T3. Bidirectional converter 3 is controlled by control device 4. While commercial AC power supply 5 is normal, bidirectional converter 3 converts AC power supplied from commercial AC power supply 5 through breaker B2, high-speed switch 1, breaker B4, and transformer 2 to DC power so that DC power is stored in battery 7. When commercial AC power supply 5 fails, bidirectional converter 3 converts DC power in battery 7 to AC power at the commercial frequency and supplies AC power to load 6 through transformer 2 and breakers B4 and B3.

Control device 4 controls high-speed switch 1 and bidirectional converter 3 based on AC voltages VI and VO and battery voltage VB. In other words, when AC voltage VI is higher than a lower limit value, control device 4 determines commercial AC power supply 5 as being normal, and when AC voltage VI is lower than the lower limit value, the control device determines that commercial AC power supply 5 has failed.

While commercial AC power supply 5 is normal, control device 4 turns on high-speed switch 1 and controls bidirectional converter 3 in synchronization with AC voltage VI so as to set battery voltage VB to a reference voltage VBr. When battery voltage VB attains to reference voltage VBr, control device 4 controls bidirectional converter 3 to convert battery voltage VB to an AC voltage VAC at the commercial frequency. AC voltage VAC is a voltage that appears at AC terminal 3*a* of bidirectional converter 3.

As AC output voltage VAC of bidirectional converter 3 is advanced in phase as compared with AC voltage VI from commercial AC power supply 5, electric power flows from battery 7 through bidirectional converter 3 to load 6 and battery voltage VB is lowered. When AC output voltage VAC is delayed in phase as compared with AC voltage VI, electric power flows from commercial AC power supply 5 through bidirectional converter 3 to battery 7 and battery voltage VB increases. Control device 4 controls bidirectional converter 3 to adjust the phase of AC voltage VAC and to maintain battery voltage VB at reference voltage VBr.

When commercial AC power supply 5 fails, control device 4 turns off high-speed switch 1 and controls bidirectional converter 3 so as to set AC voltage VO to a reference voltage VOr. When commercial AC power supply 5 recovers from a failed state to a normal state, control device 4 controls bidirectional converter 3 to match the phase and the frequency of AC voltage VO with the phase and the frequency of AC voltage VI, and thereafter turns on high-speed switch 1.

An operation of this uninterruptible power supply apparatus will now be described. When the uninterruptible power supply apparatus is used, breaker B1 is turned off and breakers B2 to B4 are turned on. While commercial AC power supply 5 is normal, high-speed switch 1 is turned on, AC power from commercial AC power supply 5 is supplied to load 6 through high-speed switch 1, and load 6 is operated.

In addition, AC power from commercial AC power supply 5 is supplied to bidirectional converter 3 through high-speed switch 1 and transformer 2 and converted to DC power so that DC power is stored in battery 7. When battery voltage VB attains to reference voltage VBr, the phase of AC output voltage VAC of bidirectional converter 3 is controlled to maintain battery voltage VB at reference voltage VBr so that bidirectional converter 3 is in a stand-by state.

When commercial AC power supply 5 fails, high-speed switch 1 is turned off and AC power is supplied from bidirectional converter 3 in the stand-by state through transformer 2 to load 6. Therefore, so long as DC power is stored in battery 7, load 6 can continue operating.

When commercial AC power supply 5 recovers from the failed state to the normal state, control device 4 controls bidirectional converter 3 to match the phase and the frequency of AC voltage VO with the phase and the frequency of AC voltage VI, and thereafter turns on high-speed switch 1. Thus, fluctuation of AC voltage VO and instability of the operation of load 6 can be prevented.

During maintenance of the uninterruptible power supply apparatus, breaker B1 is turned on and breakers B2 to B4 are turned off, so that AC power is supplied from commercial AC power supply 5 through breaker B1 to load 6 and load 6 is operated. High-speed switch 1 and the like can be maintained while load 6 is operated, by electrically disconnecting high-speed switch 1 and the like from commercial AC power supply 5.

Figure 2:
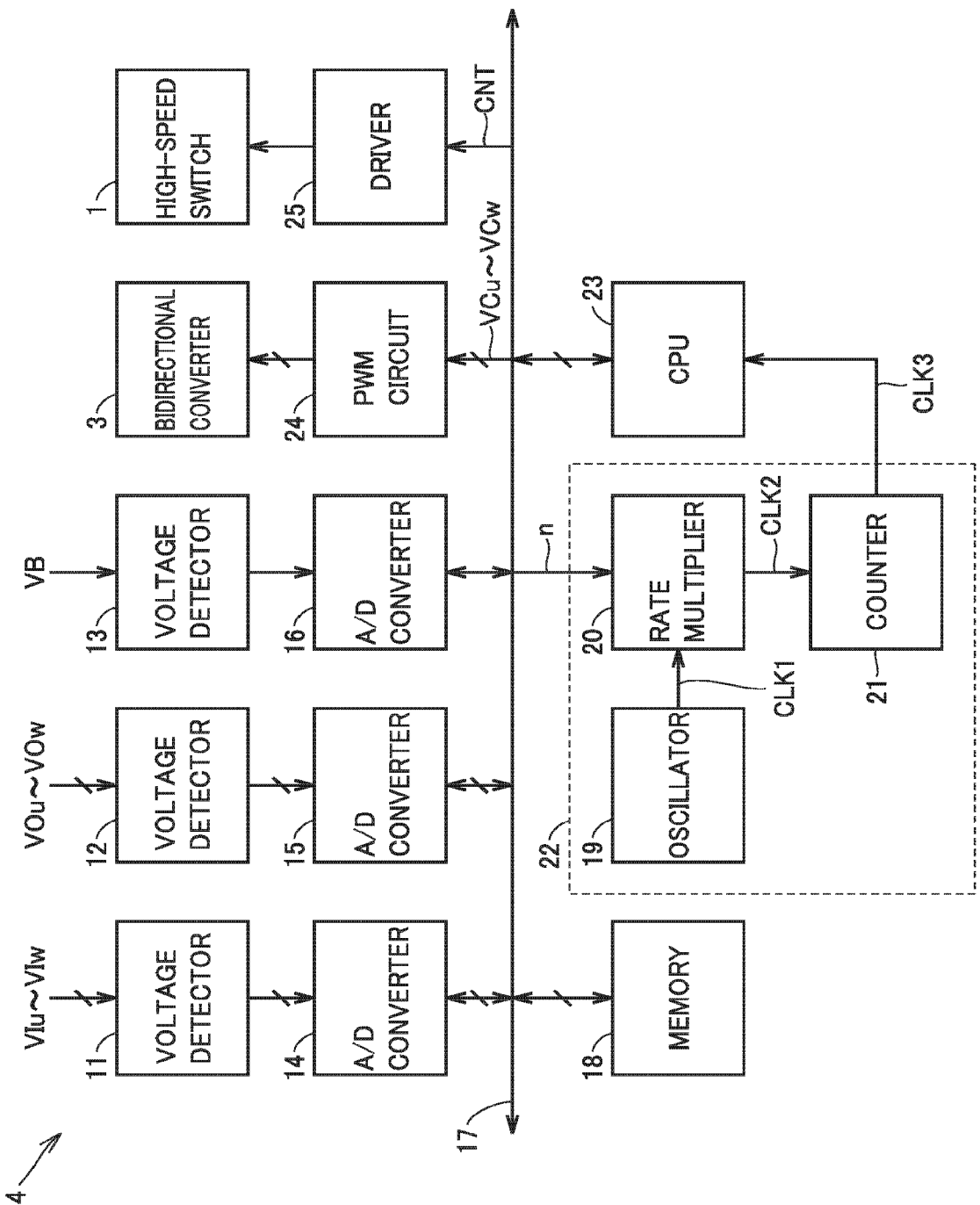
FIG. 2 is a block diagram showing a main portion of a control device shown in FIG. 1.

FIG. 2 is a block diagram showing a main portion of control device 4 shown in FIG. 1. In FIG. 2, control device 4 includes voltage detectors 11 to 13, analog-to-digital (A/D) converters 14 to 16, a data bus 17, a memory 18, an oscillator 19, a rate multiplier 20, a counter 21, a central processing unit (CPU) 23, a pulse width modulation (PWM) circuit 24, and a driver 25.

Data bus 17 is connected to A/D converters 14 to 16, memory 18, rate multiplier 20, CPU 23, PWM circuit 24, and driver 25, and serves to supply and receive information among them.

Voltage detector 11 detects instantaneous values of three-phase AC voltages VIu, VIv, and VIw supplied from commercial AC power supply 5 and provides a three-phase AC signal indicating a detection value. A/D converter 14 converts a three-phase AC signal provided from voltage detector 11 to a digital signal and provides the digital signal to CPU 23 through data bus 17.

Voltage detector 12 detects instantaneous values of three-phase AC voltages VOu, VOv, and VOw supplied from the uninterruptible power supply apparatus to load 6 and provides a three-phase AC signal indicating a detection value. A/D converter 15 converts a three-phase AC signal provided from voltage detector 12 to a digital signal and provides the digital signal to CPU 23 through data bus 17.

Voltage detector 13 detects battery voltage VB and provides a DC signal indicating a detection value. A/D converter 16 converts the DC signal provided from voltage detector 13 to a digital signal and provides the digital signal to CPU 23 through data bus 17. Memory 18 is connected to data bus 17 and stores various types of information and programs.

Oscillator 19 generates a clock signal CLK1 (a first sub clock signal) having a reference frequency fa. Rate multiplier 20 divides the frequency of clock signal CLK1 to generate a clock signal CLK2 (a second sub clock signal). A frequency division ratio of rate multiplier 20 is controlled based on a frequency division command value n supplied from CPU 23.

Figure 3:
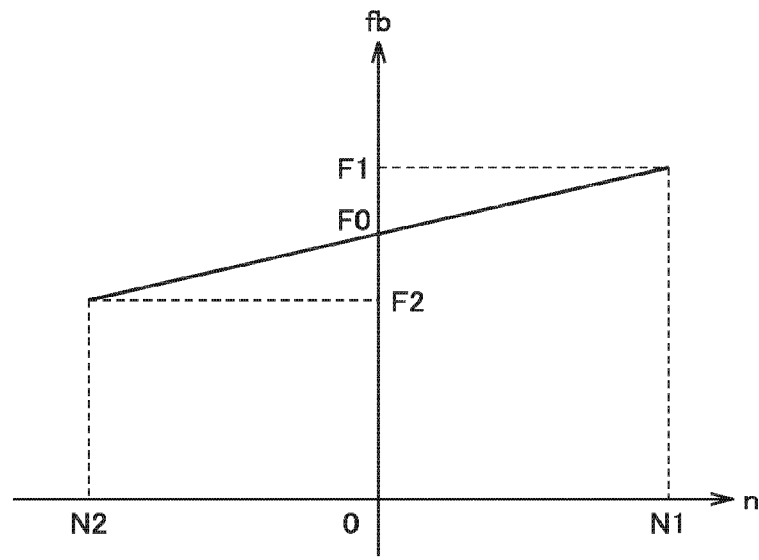
FIG. 3 is a diagram showing input and output characteristics of a rate multiplier shown in FIG. 2.

FIG. 3 is a diagram showing input and output characteristics of rate multiplier 20. In FIG. 3, the abscissa represents frequency division command value n and the ordinate represents a frequency fb of output clock signal CLK2 from rate multiplier 20. Frequency division command value n is set to any value between an upper limit value N1 and a lower limit value N2. n represents an integer. Relation of N1>0>N2 is satisfied. As n increases from N2 to N1, frequency fb increases in proportion to n.

When n is set to N2, frequency fb attains to a minimum value F2, and when n is set to N1, frequency fb attains to a maximum value F1. When relation of n=0 is satisfied, frequency fb attains to F0. A frequency F0 is called a free-running frequency, and set as a rated frequency of three-phase AC voltages VIu, VIv, and VIw supplied from commercial AC power supply 5.

Referring back to FIG. 2, counter 21 is an up-down counter, and counts pulses in output clock signal CLK2 from rate multiplier 20 and provides a clock signal CLK3 based on a result of counting. A count value of counter 21 increases in synchronization with clock signal CLK2, and when the count value attains to the maximum value, the count value decreases in synchronization with clock signal CLK2, and when the count value attains to the minimum value, the count value increases in synchronization with clock signal CLK2. Therefore, the count value varies like triangular waves. Counter 21 provides a pulse at the time when the count value attains to the maximum value and the minimum value.

Output clock signal CLK3 from counter 21 is a signal resulting from frequency division of output clock signal CLK2 from rate multiplier 20 by a constant frequency division ratio. Oscillator 19, rate multiplier 20, and counter 21 implement a clock generator 22 that generates clock signal CLK3 having a variable frequency.

Figure 4:
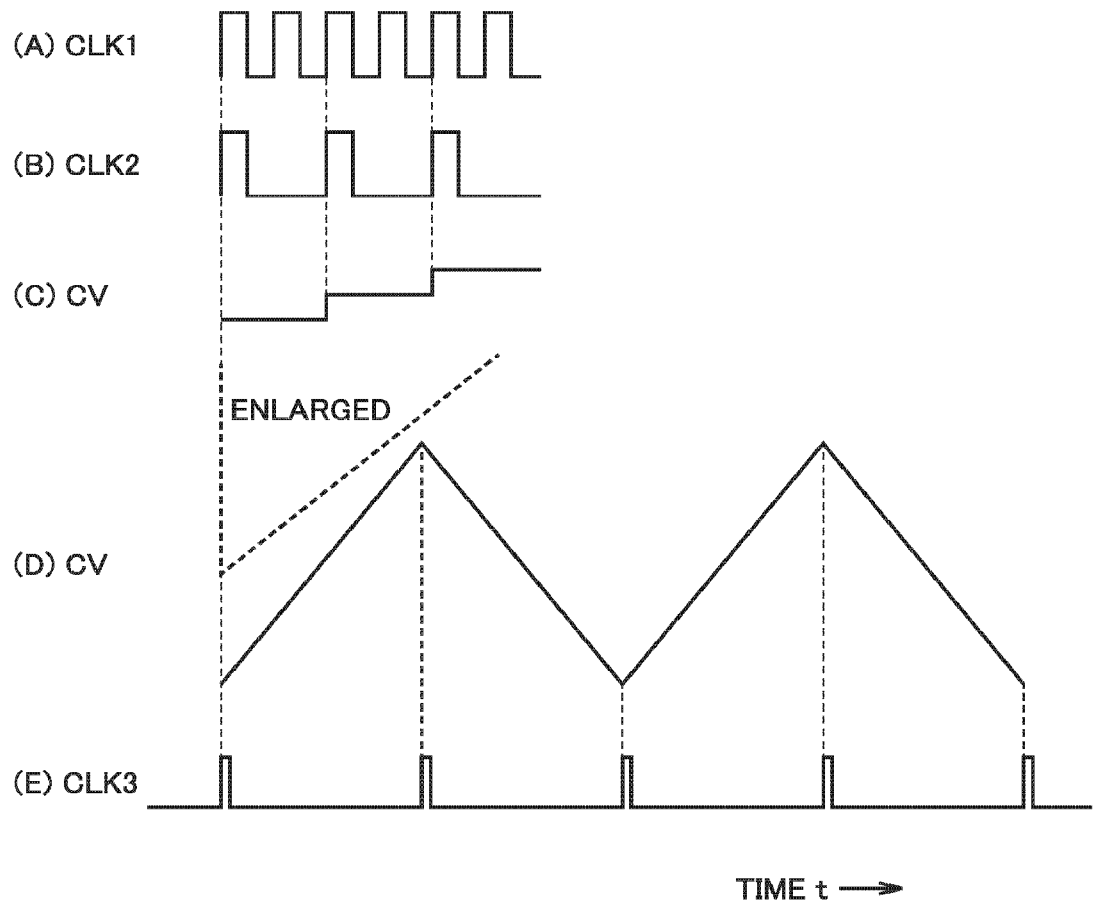
FIG. 4 is a time chart showing an operation of a clock generator shown in FIG. 2.

FIG. 4 is a time chart showing an operation of clock generator 22. In FIG. 4, (A) shows a waveform of output clock signal CLK1 from oscillator 19, (B) shows a waveform of output clock signal CLK2 from rate multiplier 20, each of (C) and (D) shows a count value CV of counter 21, and (E) shows a waveform of output clock signal CLK3 from counter 21. (C) shows an enlarged view of a time axis in (D).

For example, when CPU 23 sets a frequency division ratio K of rate multiplier 20 to ½, frequency fb of output clock signal CLK2 from rate multiplier 20 is set to ½ of frequency fa of output clock signal CLK1 from oscillator 19 (fb=fa/2). Count value CV of counter 21 is varied like triangular waves in synchronization with clock signal CLK2. Counter 21 provides a pulse when count value CV attains to the minimum value and the maximum value. A pulse train provided from counter 21 becomes output clock signal CLK3 from counter 21. Each pulse in output clock signal CLK3 from counter 21 is used as an interrupt request signal that requests CPU 23 to perform interrupt processing.

Count value CV like triangular waves can be used as a carrier signal of PWM circuit 24. It is assumed that a resolution of a triangular carrier signal is set to 8 bits (=256), a frequency thereof is set to 6 kHz, and an output frequency of bidirectional converter 3 is set to 60 Hz. Then, timing of control of bidirectional converter 3 is 6 kHz×2÷60 Hz=200 times.

Frequency fb of output clock signal CLK2 from rate multiplier 20 is calculated as 6 kHz×2×256=3.072 MHz. Therefore, by setting a dynamic range of rate multiplier 20 to twice as large and setting frequency division ratio K in a steady state to ½, frequency fa of output clock signal CLK1 from oscillator 19 is calculated as 3.072 MHz×2=6.144 MHz. When control of an output voltage from bidirectional converter 3 is carried out by digital control, a counter and an oscillator for carriers are required. Therefore, in actual, synchronization control in the present embodiment can be carried out simply by adding rate multiplier 20.

When interrupt processing is performed 200 times per one cycle, CPU 23 advances phase information θ by 2π/200 each time of interrupt processing, calculates a phase difference dθ between phase information θ and three-phase AC voltages VIu, VIv, and VIw supplied from commercial AC power supply 5, and controls frequency division command value n for rate multiplier 20 so as to eliminate phase difference dθ.

CPU 23 generates three-phase voltage command values VCu, VCv, and VCw based on phase information θ, and provides voltage command values VCu, VCv, and VCw to PWM circuit 24. PWM circuit 24 carries out PWM control of bidirectional converter 3 based on voltage command values VCu, VCv, and VCw provided from CPU 23.

CPU 23 determines whether or not commercial AC power supply 5 is normal based on a digital signal supplied from A/D converter 14. While commercial AC power supply 5 is normal, CPU 23 sets a control signal CNT to the "H" level, and when commercial AC power supply 5 fails, the CPU sets control signal CNT to the "L" level. When control signal CNT is at the "H" level, driver 25 turns on high-speed switch 1, and when control signal CNT is at the "L" level, the driver turns off high-speed switch 1.

When commercial AC power supply 5 recovers from the failed state to the normal state, CPU 23 matches phase information θ with phases of three-phase AC voltages VIu, VIv, and VIw supplied from commercial AC power supply 5 and matches the phases and the frequencies of three-phase AC voltages VOu, VOv, and VOw generated by bidirectional converter 3 and transformer 2 with the phases and the frequencies of three-phase AC voltages VIu, VIv, and VIw, and thereafter turns on high-speed switch 1.

Voltage detector 11, A/D converter 14, data bus 17, memory 18, clock generator 22, and CPU 23 in FIG. 2 implement a synchronization control circuit 30 that generates phase information θ in phase with three-phase AC voltages VIu, VIv, and VIw (three-phase AC signal) supplied from commercial AC power supply 5. Synchronization control circuit 30 operates based on a program stored in memory 18.

Figure 5:
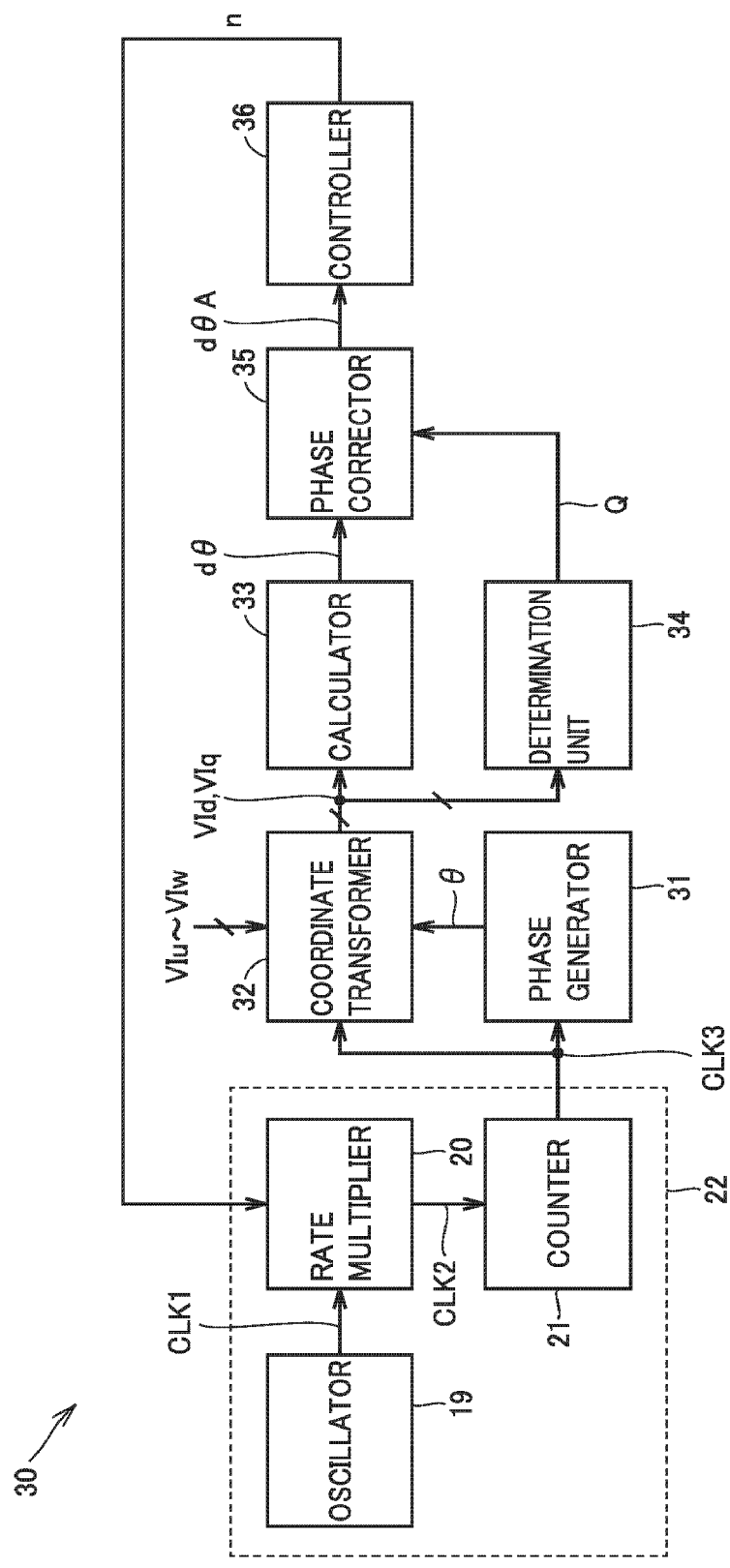
FIG. 5 is a block diagram showing a synchronization control circuit including the clock generator and the like shown in FIG. 2.

FIG. 5 is a block diagram showing a configuration of synchronization control circuit 30. In FIG. 5, synchronization control circuit 30 includes clock generator 22, a phase generator 31, a coordinate transformer 32, a calculator 33, a determination unit 34, a phase corrector 35, and a controller 36.

Phase generator 31 advances phase information θ by a prescribed angle Δθ in response to each pulse in output clock signal CLK3 from clock generator 22. For example, when interrupt is carried out 200 times per one cycle, relation of Δθ=2π/200 is satisfied.

Phase generator 31 includes a phase counter. A count value of the phase counter is stored in memory 18. Phase generator 31 increments the count value of the phase counter in response to each pulse in clock signal CLK3. For example, when interrupt is carried out 200 times per one cycle, the phase counter is a modulo counter that repeatedly counts from 0 to 199. Phase information θ is a value obtained by multiplying AO by a count value C of the phase counter (θ=Δθ×C).

Coordinate transformer 32 samples three-phase AC voltages VIu, VIv, and VIw supplied from commercial AC power supply 5 in response to each pulse in output clock signal CLK3 from clock generator 22 and transforms sampled three-phase AC voltages VIu, VIv, and VIw to a vector VE on the rotational coordinates with phase information θ being defined as the reference. A function of coordinate transformer 32 is performed by voltage detector 11, A/D converter 14, CPU 23, and memory 18. A data table of sinusoidal waves is stored in memory 18.

In other words, coordinate transformer 32 samples three-phase AC voltages VIu, VIv, and VIw supplied from commercial AC power supply 5 in response to each pulse in output clock signal CLK3 from clock generator 22 and subjects sampled three-phase AC voltages VIu, VIv, and VIw to A/D conversion. Coordinate transformer 32 uses count value C of the phase counter to read a sin value and a cos value expressed in the following expressions (1) to (6) from the data table of the sinusoidal waves.

$$\sin U = \sin(2\pi C/C0) \quad (1)$$

$$\sin V = \sin(2\pi C/C0 - 2\pi/3) \quad (2)$$

$$\sin W = \sin(2\pi C/C0 + 2\pi/3) \quad (3)$$

$$\cos U = \cos(2\pi C/C0) \quad (4)$$

$$\cos V = \cos(2\pi C/C0 - 2\pi/3) \quad (5)$$

$$\cos W = \cos(2\pi C/C0 + 2\pi/3) \quad (6)$$

C0 represents the number of interrupts per one cycle, and it is set, for example, to 200. $2\pi C/C0$ represents phase information θ.

Coordinate transformer 32 then transforms three-phase AC voltages VIu, VIv, and VIw to vector VE on the rotational coordinates based on data signals DIu, DIv, and DIw and the following expression (7).

[Expression 1]

$$\begin{bmatrix} VBd \\ VBq \end{bmatrix} = \sqrt{\frac{2}{3}} \begin{bmatrix} \sin U & \sin V & \sin W \\ \cos U & \cos V & \cos W \end{bmatrix} \begin{bmatrix} VBu \\ VBv \\ VBw \end{bmatrix} \quad (7)$$

When a frequency fv of three-phase AC voltages VIu, VIv, and VIw is equal to a frequency fc of the phase counter and the phase of three-phase AC voltages VIu, VIv, and VIw is advanced by dθ as compared with phase information θ, the following expressions (8) to (10) are established.

$$VIu = VI1 \cdot \sin(2\pi fv + d\theta) \quad (8)$$

$$VIv = VI1 \cdot \sin(2\pi fv - 2\pi/3 + d\theta) \quad (9)$$

$$VIw = VI1 \cdot \sin(2\pi fv + 2\pi/3 + d\theta) \quad (10)$$

In this case, a d axis component VId and a q axis component VIq of vector VE are expressed in the following expressions (11) and (12).

$$VId = (3/2)^{1/2} VI1 \cdot \cos(d\theta) \quad (11)$$

$$VIq = (3/2)^{1/2} VI1 \cdot \sin(d\theta) \quad (12)$$

Figure 6:
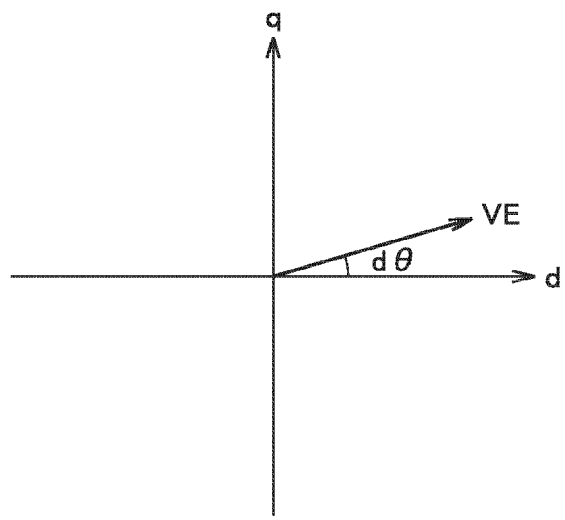
FIG. 6 is a diagram for illustrating an operation of a coordinate transformer shown in FIG. 5.

FIG. 6 is a diagram showing vector VE on the rotational coordinates. In FIG. 6, the rotational coordinates include the d axis and the q axis. Vector VE is shown with an arrow starting from the origin. Vector VE has a length of $(3/2)^{1/2}$ VI1 and the phase difference between vector VE and the d axis is expressed as dθ. Phase difference dθ between three-phase AC voltages VIu, VIv, and VIw and phase information θ is equal to phase difference dθ between vector VE and the d axis. d axis component VId and q axis component VIq of vector VE are given to calculator 33 and determination unit 34.

Calculator 33 calculates phase difference dθ between vector VE and the d axis (reference axis) of the rotational coordinates based on d axis component VId and q axis component VIq of vector VE. Calculator 33 calculates phase difference dθ based on the following expression (13).

$$d\theta = \sin^{-1}\{VIq/(VId^2 + VIq^2)^{1/2}\} \quad (13)$$

Determination unit 34 determines in which subquadrant Q of a first subquadrant Q1 to an eighth subquadrant Q8 of the rotational coordinates the vector is located based on d axis component VId and q axis component VIq of vector VE.

Figure 7:
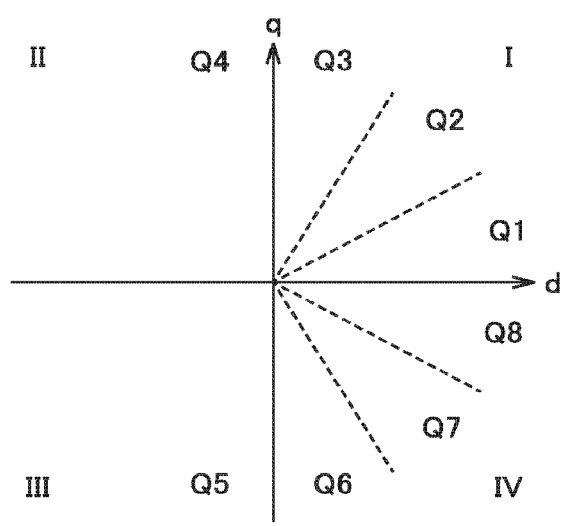
FIG. 7 is a diagram for illustrating an operation of a determination unit shown in FIG. 5.

FIG. 7 is a diagram showing first subquadrant Q1 to eighth subquadrant Q8 set in the rotational coordinates. In FIG. 7, a region from 0 to π/2 on the rotational coordinates is defined as a Ist quadrant, a region from π/2 to π is defined as a IInd quadrant, a region from 0 to (−π/2) is defined as a IIIrd quadrant, and a region from (−π/2) to (−π) is defined as a IVth quadrant.

The Ist quadrant is equally divided into first subquadrant Q1, a second subquadrant Q2, and a third subquadrant Q3 in a counterclockwise direction, a fourth subquadrant Q4 is defined as the IInd quadrant, a fifth subquadrant Q5 is defined as the IIIrd quadrant, and the IVth quadrant is equally divided into a sixth subquadrant Q6, a seventh subquadrant Q7, and eighth subquadrant Q8 in the counterclockwise direction.

In other words, in the rotational coordinates, a region from 0 to π/6 is defined as first subquadrant Q1, a region from π/6 to π/3 is defined as second subquadrant Q2, a region from π/3 to π/2 is defined as third subquadrant Q3, and a region from π/2 to π is defined as fourth subquadrant Q4. A region from 0 to (−π/6) is defined as eighth subquadrant Q8, a region from (−π/6) to (−π/3) is defined as seventh subquadrant Q7, a region from (−π/3) to (−π/2) is defined as sixth subquadrant Q6, and a region from (−π/2) to (−π) is defined as fifth subquadrant Q5.

For example, determination unit 34 determines in which subquadrant Q of first subquadrant Q1 to eighth subquadrant Q8 vector VE is located based on a ratio between d axis component VId and q axis component VIq of vector VE and polarity of each of them.

For example, when a ratio between VId and VIq is 1.0 and the polarities of VId and VIq are both positive, vector VE is located in second subquadrant Q2. When a ratio between VId and VIq is −1.0 and the polarities of VId and VIq are positive and negative, respectively, vector VE is located in seventh subquadrant Q7.

Figure 8:
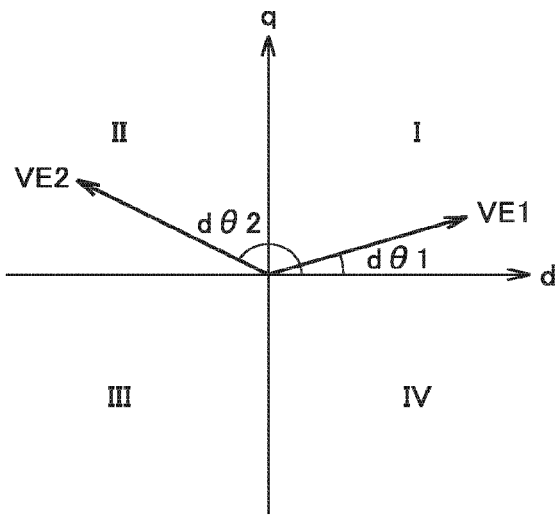
FIG. 8 is a diagram for illustrating an operation of a phase corrector shown in FIG. 5.

Phase corrector 35 corrects phase difference dθ calculated by calculator 33 based on a result of determination by determination unit 34 to generate phase difference dθA. The reason why phase difference θ is corrected will be described. FIG. 8 shows a vector VE1 located in the Ist quadrant and a vector VE2 located in the IInd quadrant. A phase difference between vector VE1 and the d axis is expressed as dθ1 and a phase difference between vector VE2 and the d axis is expressed as dθ2. dθ1 ranges from 0 to π/2 and dθ2 ranges from π/2 to π.

When calculator 33 calculates phase difference dθ of vectors VE1 and VE2 based on the expression (13), phase difference dθ1 of vector VE1 in the Ist quadrant is correctly calculated, whereas phase difference dθ2 of vector VE2 in the IInd quadrant is not correctly calculated but calculated as (π−dθ2). Therefore, as phase difference dθ of vector VE is gradually increased in the IInd quadrant, a value of dθ calculated by calculator 33 gradually decreases, and as phase difference dθ of vector VE is set to π, a value of dθ calculated by calculator 33 is 0 degree.

Synchronization control circuit 30 controls frequency division command value n for rate multiplier 20 such that phase difference dθ of vector VE attains to 0 degree. Therefore, unless dθ is corrected, not only in a case of dθ=0 but also in a case of dθ=π, a synchronization control operation is locked. Then, when determination unit 34 determines that vector VE is located in the IInd quadrant, phase corrector 35 corrects phase difference dθ calculated by calculator 33 to a positive restriction value PLM (for example, π/2).

Similarly, phase difference dθ of vector VE in the IVth quadrant is correctly calculated, whereas phase difference dθ of vector VE in the IIIrd quadrant is not correctly calculated but calculated as (−π−dθ). Therefore, as phase difference dθ of vector VE is gradually increased toward the negative side in the IIIrd quadrant, a value of dθ calculated by calculator 33 gradually increases toward the positive side, and when phase difference dθ of vector VE is set to −π, a value of dθ calculated by calculator 33 is set to 0 degree.

Synchronization control circuit 30 controls frequency division command value n for rate multiplier 20 so as to set phase difference dθ of vector VE to 0 degree. Therefore, unless dθ is corrected, not only in a case of dθ=0 but also in a case of dθ=−π, a synchronization control operation is locked. Then, when determination unit 34 determines that vector VE is located in the IIIrd quadrant, phase corrector 35 corrects phase difference dθ calculated by calculator 33 to a negative restriction value NLM (for example, −π/2).

Figure 9:
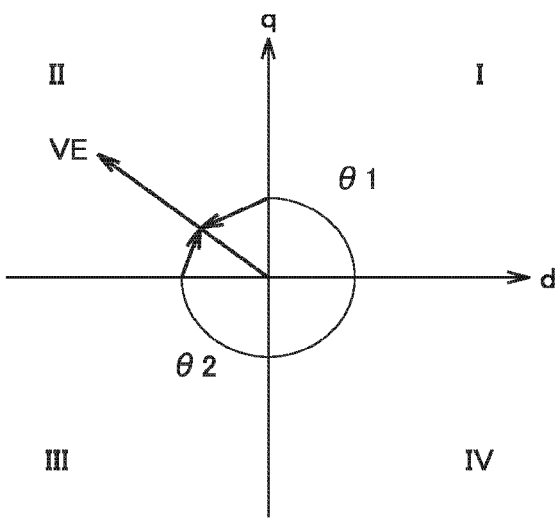
FIG. 9 is another diagram for illustrating an operation of the phase corrector shown in FIG. 5.

As shown in FIG. 9, when vector VE is located in the IInd quadrant, whether vector VE is advanced by phase difference dθ1 or delayed by phase difference dθ2 with the d axis being defined as the reference is not known. Incorrect detection as to whether vector VE is advanced or delayed in phase causes controller 36 in a subsequent stage to increase phase difference dθ between vector VE and phase information θ.

In the present embodiment, a subquadrant Qn where a vector VEn generated in response to a present pulse (interrupt request signal) is located is compared with a subquadrant Qp where a vector VEp generated in response to a previous pulse (interrupt request signal) is located to determine whether present vector VEn is advanced or delayed in phase based on a result of comparison, and phase difference θ is corrected based on a result of determination.

In order to quickly determine whether vector VE is advanced or delayed in phase in the present embodiment, the Ist quadrant is divided into first subquadrant Q1 to third subquadrant Q3 and the IVth quadrant is divided into sixth subquadrant Q6 to eighth subquadrant Q8.

Furthermore, in order to quickly converge phase difference dθ of vector VE to 0 in the present embodiment, when magnitude of phase difference dθ is equal to or smaller than a prescribed value (for example, π/2), a corrected phase difference dθA is generated by subtracting a phase difference dθp of previous vector VEp from phase difference dθ of present vector VEn (dθA=dθ−dθp). The polarity of phase difference dθ is thus reversed and magnitude of phase difference dθ is reduced.

Figure 10:
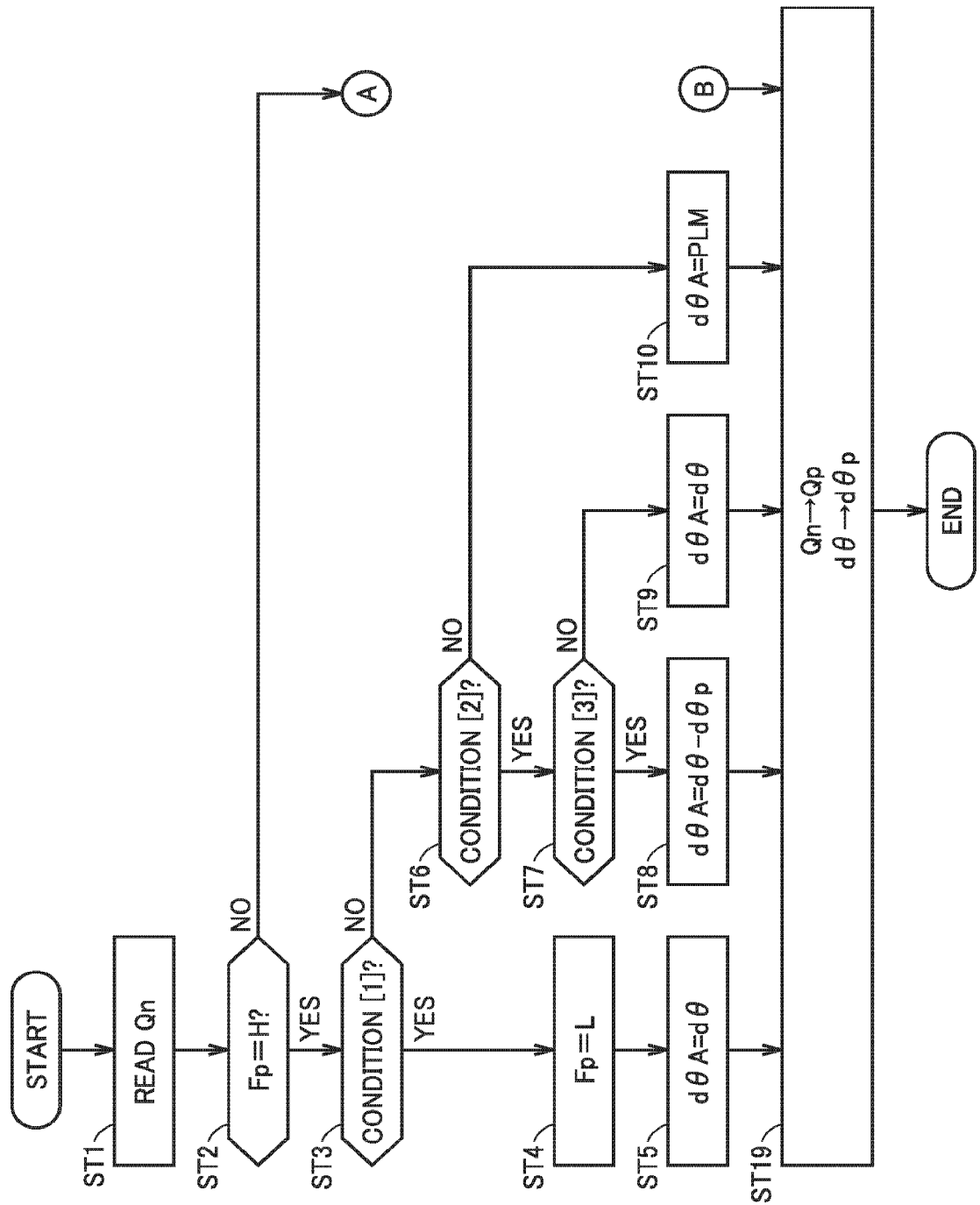
FIG. 10 is a flowchart showing one part of operations of the phase corrector shown in FIG. 5.
Figure 11:
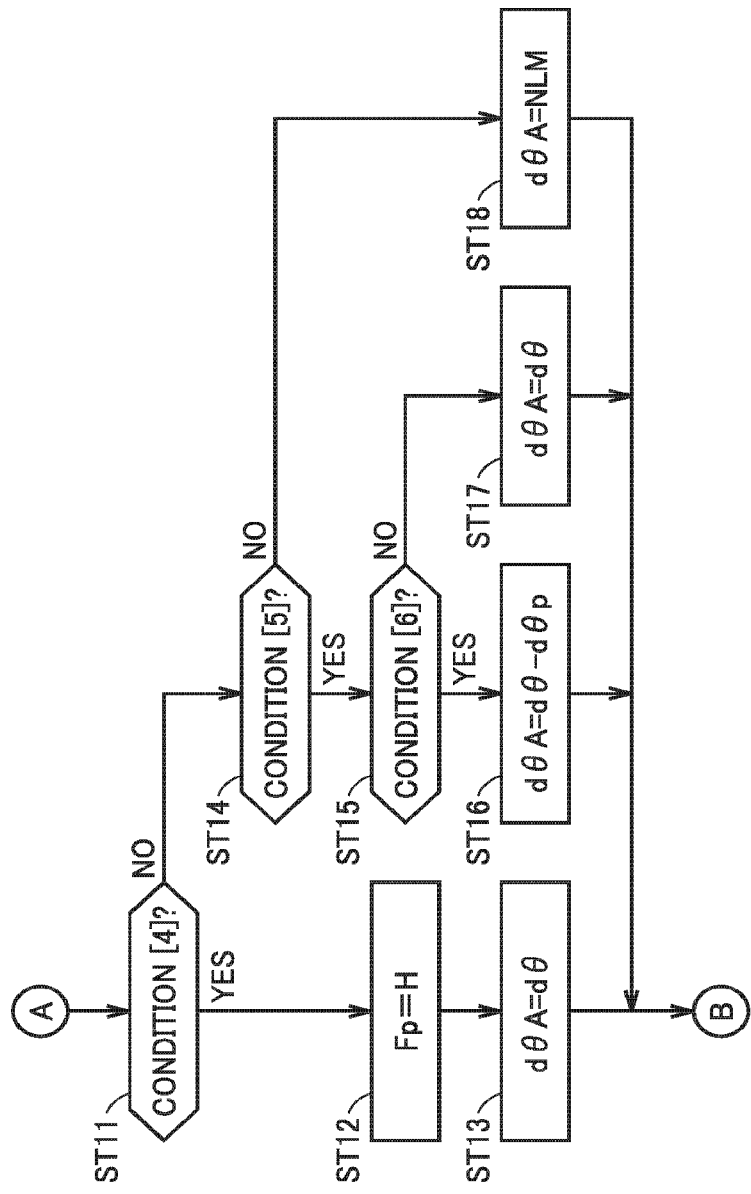
FIG. 11 is a flowchart showing another part of operations of the phase corrector shown in FIG. 5.

FIG. 10 is a flowchart showing one part of operations of phase corrector 35 and FIG. 11 is a flowchart showing another part of the operations of phase corrector 35. In step ST1 in FIG. 10, phase corrector 35 reads from determination unit 34, subquadrant Qn where vector VEn generated in response to the present pulse (interrupt request signal) is located.

In step ST2, phase corrector 35 determines whether or not a phase difference flag Fp stored in memory 18 is at the "H" level. When vector VEp generated in response to the previous pulse (interrupt request signal) is advanced in phase, phase difference flag Fp is at the "H" level (Fp=H). When previous vector VEp is delayed in phase, phase difference flag Fp is at the "L" level (Fp=L).

When phase difference flag Fp is at the "H" level in step ST2, in step ST3, phase corrector 35 determines whether or not subquadrant Qn where present vector VEn is located and subquadrant Qp where previous vector VEp is located that is stored in memory 18 satisfy a condition [1] in FIG. 12.

There are three cases where the condition [1] is satisfied. The first case is a case where present vector VEn is located in sixth subquadrant Q6 and previous vector VEp is located in seventh subquadrant Q7, eighth subquadrant Q8, first subquadrant Q1, second subquadrant Q2, or third subquadrant Q3. The second case is a case where present vector VEn is located in seventh subquadrant Q7 and previous vector VEp is located in eighth subquadrant Q8, first subquadrant Q1, second subquadrant Q2, or third subquadrant Q3. The third case is a case where present vector VEn is located in eighth subquadrant Q8 and previous vector VEp is located in first subquadrant Q1, second subquadrant Q2, or third subquadrant Q3.

In other words, the condition [1] is satisfied when present vector VEn is located in any subquadrant Qn of subquadrants Q6 to Q8 and previous vector VEp is located in subquadrant Qp on the counterclockwise side of subquadrant Qn among subquadrants Q7, Q8, and Q1 to Q3.

When phase corrector 35 determines in step ST3 that the condition [1] is satisfied, it determines that vector VE has rotated clockwise, that is, present vector VEn is delayed in phase. In step S4, phase corrector 35 sets phase difference flag Fp to the "L" level, and in step ST5, phase corrector 35 sets present phase difference dθ as it is as corrected phase difference dθA (dθA=dθ). The process then proceeds to step ST19.

When phase corrector 35 determines in step ST3 that the condition [1] is not satisfied, it determines that present vector VEn is advanced in phase and determines in step ST6 whether or not the condition [2] is satisfied. The condition [2] is satisfied when present vector VEn is located in any subquadrant Qn of subquadrants Q1 to Q3 and Q6 to Q8. In other words, the condition [2] is satisfied when present vector VEn is located in the Ist quadrant or the IVth quadrant.

When phase corrector 35 determines in step ST6 that the condition [2] is satisfied, phase corrector 35 determines in step ST7 whether or not the condition [3] is satisfied. The condition [3] is satisfied when present vector VEn is located in any subquadrant Qn of subquadrants Q1 to Q3. In other words, the condition [3] is satisfied when present vector VEn is located in the Ist quadrant and when magnitude of phase difference dθ is smaller than a prescribed value ($\pi/2$).

When phase corrector 35 determines in step ST7 that the condition [3] is satisfied, it determines that phase difference dθ of present vector VEn becomes closer to 0 degree. In step ST8, phase corrector 35 sets a difference (dθ−dθp) between phase difference dθ of present vector VEn and phase difference dθp of previous vector VEp as corrected phase difference dθA (dθA=dθ−dθp), and the process proceeds to step ST19. Small phase difference dθA reverse in polarity to phase difference dθ of present vector VEn is thus generated and phase difference dθA is quickly converged to 0 degree.

When phase corrector 35 determines in step ST7 that the condition [3] is not satisfied, in step ST9, phase corrector 35 sets phase difference dθ of present vector VEn as it is as corrected phase difference dθA (dθA=dθ) and the process proceeds to step ST19.

When phase corrector 35 determines in step ST6 that the condition [2] is not satisfied, it determines that present vector VEn is located in fourth subquadrant Q4 (that is, the IInd quadrant). In step ST10, phase corrector 35 corrects phase difference dθ of present vector VEn to positive restriction value PLM (dθA=PLM) and the process proceeds to step ST19.

When phase difference flag Fp is not at the "H" level in step ST2, in step ST11 in FIG. 11, phase corrector 35 determines whether or not subquadrant Qn where present vector VEn is located and subquadrant Qp where previous vector VEp is located that is stored in memory 18 satisfy the condition [4] in FIG. 13.

There are three cases where the condition [4] is satisfied. The first case is a case where present vector VEn is located in third subquadrant Q3 and previous vector VEp is located in second subquadrant Q2, first subquadrant Q1, eighth subquadrant Q8, seventh subquadrant Q7, or sixth subquadrant Q6. The second case is a case where present vector VEn is located in second subquadrant Q2 and previous vector VEp is located in first subquadrant Q1, eighth subquadrant Q8, seventh subquadrant Q7, or sixth subquadrant Q6. The third case is a case where present vector VEn is located in first subquadrant Q1 and previous vector VEp is located in eighth subquadrant Q8, seventh subquadrant Q7, or sixth subquadrant Q6.

In other words, the condition [4] is satisfied when present vector VEn is located in any subquadrant Qn of subquadrants Q1 to Q3 and previous vector VEp is located in subquadrant Qp on the clockwise side of subquadrant Qn among subquadrants Q6 to Q8, Q1, and Q2.

When phase corrector 35 determines in step ST11 that the condition [4] is satisfied, it determines that vector VE has rotated counterclockwise, that is, present vector VEn is advanced in phase. In step ST12, phase corrector 35 sets phase difference flag Fp to the "H" level, and in step ST13, phase corrector 35 sets present phase difference dθ as it is as corrected phase difference dθA (dθA=dθ). The process then proceeds to step ST19.

When phase corrector 35 determines in step ST11 that the condition [4] is not satisfied, it determines that present vector VEn is delayed in phase. In step ST14, phase corrector 35 determines whether or not the condition [5] is satisfied. The condition [5] is satisfied when present vector VEn is located in any subquadrant Qn of subquadrants Q1 to Q3 and Q6 to Q8. In other words, the condition [5] is satisfied when present vector VEn is located in the Ist quadrant or the IVth quadrant.

When phase corrector 35 determines in step ST14 that the condition [5] is satisfied, it determines in step ST15 whether or not the condition [6] is satisfied. The condition [6] is satisfied when present vector VEn is located in any subquadrant Qn of subquadrants Q6 to Q8. In other words, the condition [6] is satisfied when present vector VEn is located in the IVth quadrant and when magnitude of phase difference dθ is smaller than the prescribed value ($\pi/2$).

When phase corrector 35 determines in step ST15 that the condition [6] is satisfied, it determines that phase difference dθ of present vector VEn becomes closer to 0 degree. In step ST16, phase corrector 35 sets a difference (dθ−dθp) between phase difference dθ of present vector VEn and phase difference dθp of previous vector VEp as corrected phase difference dθA (dθA=dθ−dθp), and the process proceeds to step ST19. Small phase difference dθA reverse in polarity to phase difference dθ of present vector VEn is thus generated and phase difference dθA is quickly converged to 0 degree.

When phase corrector 35 determines in step ST15 that the condition [6] is not satisfied, in step ST17, it sets phase difference dθ of present vector VEn as it is as corrected phase difference dθA (dθA=dθ), and the process proceeds to step ST19.

When phase corrector 35 determines in step ST14 that the condition [5] is not satisfied, it determines that present vector VEn is located in fifth subquadrant Q5 (that is, the IIIrd quadrant). In step ST18, phase corrector 35 corrects phase difference dθ of present vector VEn to negative restriction value NLM (dθA=NLM), and the process proceeds to step ST19.

In step ST19, phase corrector 35 has memory 18 store subquadrant Qn where present vector VEn is located as subquadrant Qp where previous vector VEp is located, and has memory 18 store phase difference dθ of present vector VEn as phase difference dθp of previous vector VEp. Phase correction processing corresponding to one interrupt request signal thus ends.

Referring back to FIG. 5, controller 36 generates frequency division command value n so as to set corrected phase difference dθA to 0 degree to thereby control the frequency division ratio of rate multiplier 20 and control frequency fc of output clock signal CLK3 from clock generator 22.

Specifically, controller 36 performs proportional integral (PI) calculation onto corrected phase difference dθA in accordance with the following expression (14):

$$U(S) = Kp(1 + Ki/S) \times d\theta A \quad (14)$$

where U(S) represents an amount of operation, Kp represents a proportional gain, Ki represents an integral gain, and S represents a Laplace operator.

Controller 36 generates frequency division command value n based on amount of operation U(S). Namely, controller 36 controls frequency division command value n such that the sum of a value in proportion to phase difference dθA and a value in proportion to an integral of phase difference dθA is 0.

When phase difference dθA exhibits advance in phase, frequency division command value n is adjusted in a positive direction to increase frequency fb of output clock signal CLK2 from rate multiplier 20 (FIG. 3) and to increase frequency fc of output clock signal CLK3 from counter 21. Thus, an interrupt cycle becomes shorter and the phase counter of a program is counted up fast, so that in a steady state, phase information θ is in phase with three-phase AC voltages VIu, VIv, and VIw supplied from commercial AC power supply 5.

In contrast, when phase difference dθA exhibits delay in phase, frequency division command value n is adjusted in a negative direction to lower frequency fb of output clock signal CLK2 from rate multiplier 20 (FIG. 3) and to lower frequency fc of output clock signal CLK3 from counter 21. Thus, the interrupt cycle becomes longer and the phase counter of the program is slowly counted up, so that in the steady state, phase information θ is in phase with three-phase AC voltages VIu, VIv, and VIw supplied from commercial AC power supply 5.

Figure 14:
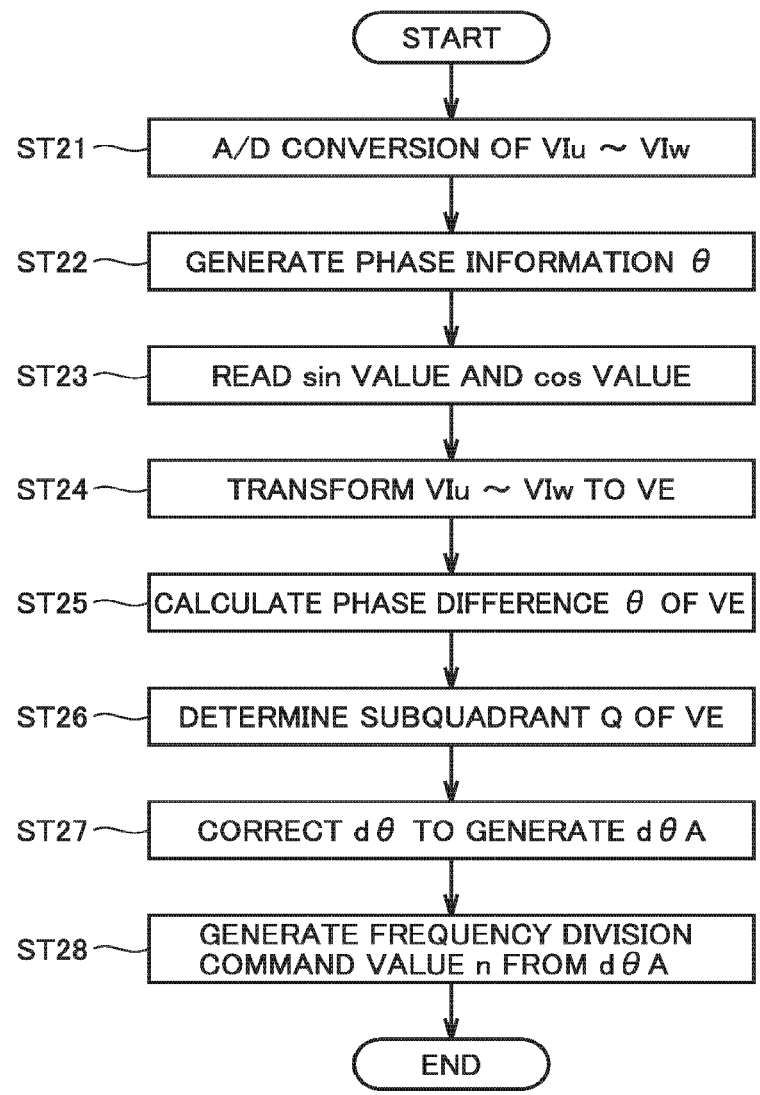
FIG. 14 is a flowchart showing operations of the synchronization control circuit shown in FIG. 5.

FIG. 14 is a flowchart showing operations of synchronization control circuit 30 shown in FIGS. 5 to 13. In step ST21 in FIG. 14, coordinate transformer 32 transforms three-phase AC voltages VIu, VIv, and VIw supplied from commercial AC power supply 5 to a digital signal. In step ST22, phase generator 31 increments count value C of the phase counter to generate phase information θ=2πC/C0.

In step ST23, coordinate transformer 32 uses phase information θ to read a sin value and a cos value shown in the mathematical expressions (1) to (6) from the data table of the sinusoidal waves. In step ST24, coordinate transformer 32 subjects three-phase AC voltages VIu, VIv, and VIw converted to a digital signal to dq transformation based on the mathematical expression (7) to calculate d axis component VId and q axis component VIq. Three-phase AC voltages VIu, VIv, and VIw are thus transformed to vector VE on the rotational coordinates.

In step ST25, calculator 33 calculates phase difference dθ between vector VE and the d axis based on the mathematical expression (13). In step ST26, determination unit 34 determines in which subquadrant of subquadrants Q1 to Q8 vector VE is located. In step S27, phase corrector 35 performs steps ST1 to ST19 (FIGS. 10 and 11) to correct phase difference dθ of vector VE to generate phase difference dθA.

In step ST28, controller 36 calculates amount of operation U(S) by subjecting corrected phase difference dθA to PI calculation, generates frequency division command value n, and provides the amount of operation and the frequency division command value to rate multiplier 20. Steps ST21 to ST28 are performed in response to each pulse (interrupt request signal) in output clock signal CLK3 from clock generator 22.

Figure 15:
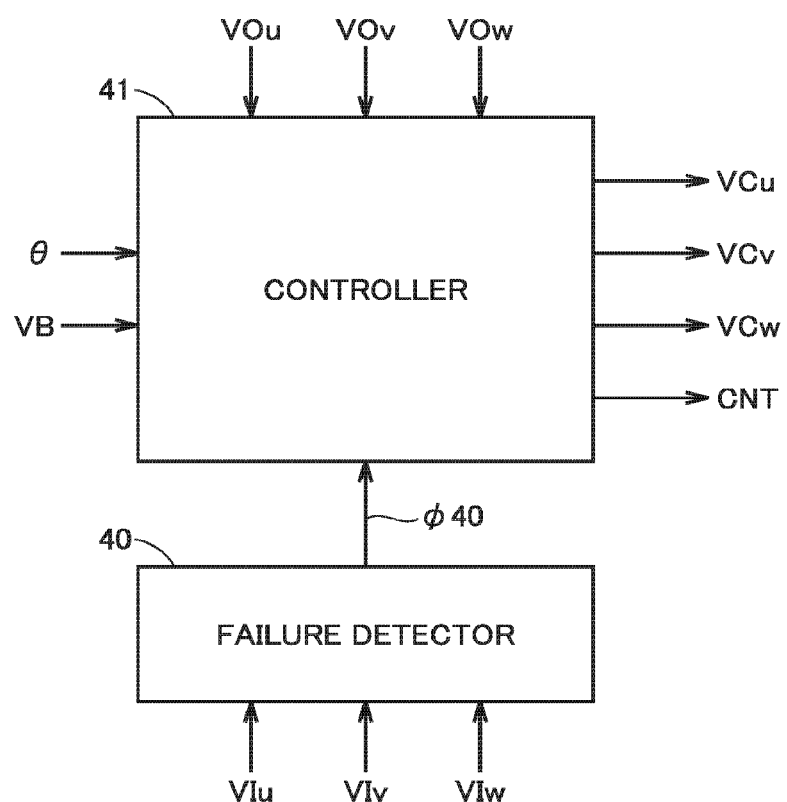
FIG. 15 is a block diagram showing a configuration of a portion relating to control of a high-speed switch and a bidirectional converter in the control device shown in FIG. 2.

FIG. 15 is a block diagram showing a configuration of a portion relating to control of high-speed switch 1 and bidirectional converter 3 in control device 4. In FIG. 15, control device 4 includes a failure detector 40 and a controller 41. Failure detector 40 includes voltage detector 11, A/D converter 14, and CPU 23 (FIG. 2). Controller 41 includes voltage detectors 12 and 13, A/D converters 15 and 16, and CPU 23 (FIG. 2).

Failure detector 40 detects whether or not commercial AC power supply 5 has failed based on three-phase AC voltages VIu, VIv, and VIw supplied from commercial AC power supply 5 and provides a signal φ40 indicating a result of detection. While commercial AC power supply 5 is normal, signal φ40 is set to the "H" level, and when commercial AC power supply 5 fails, signal φ40 is set to the "L" level.

When failure detection signal φ40 is at the "H" level, controller 41 sets control signal CNT (FIG. 2) to the "H" level to turn on high-speed switch 1, generates three-phase voltage command values VCu, VCv, and VCw based on phase information θ and battery voltage VB, and provides the three-phase voltage command values to PWM circuit 24 (FIG. 2). PWM circuit 24 carries out PWM control of bidirectional converter 3 in accordance with three-phase voltage command values VCu, VCv, and VCw.

When battery voltage VB is lower than reference voltage VBr, three-phase voltage command values VCu, VCv, and VCw delayed in phase as compared with phase information θ are generated. Thus, electric power flows from commercial AC power supply 5 through high-speed switch 1, transformer 2, and bidirectional converter 3 to battery 7 and battery 7 is charged.

When battery voltage VB is higher than reference voltage VBr, three-phase voltage command values VCu, VCv, and VCw advanced in phase as compared with phase information θ are generated. Thus, electric power flows from battery 7 through bidirectional converter 3 and transformer 2 to load 6 and battery 7 is discharged.

When battery voltage VB is equal to reference voltage VBr, three-phase voltage command values VCu, VCv, and VCw in a phase in accordance with phase information θ are generated and bidirectional converter 3 is set to the stand-by state.

When commercial AC power supply 5 fails and signal φ40 falls from the "H" level to the "L" level, controller 41 sets control signal CNT to the "L" level to turn off high-speed switch 1 and continues to generate three-phase voltage command values VCu, VCv, and VCw in a phase immediately before failure.

When commercial AC power supply 5 recovers and signal φ40 rises from the "L" level to the "H" level, controller 41 generates three-phase voltage command values VCu, VCv, and VCw such that new phase information θ is in phase with three-phase AC voltages VOu, VOv, and VOw generated by bidirectional converter 3.

When new phase information θ is in phase with three-phase AC voltages VOu, VOv, and VOw, controller 41 sets control signal CNT to the "H" level to turn on high-speed switch 1. Since three-phase AC voltages VOu, VOv, and VOw generated by bidirectional converter 3 are in phase with three-phase AC voltages VIu, VIv, and VIw supplied from commercial AC power supply 5 at this time, a source of supply of electric power to load 6 can smoothly be switched from bidirectional converter 3 to commercial AC power supply 5.

As set forth above, in this embodiment, phase difference dθ between vector VE and the d axis of the rotational coordinates is calculated. When magnitude of phase difference dθ is larger than a prescribed value (for example, π/2), phase difference dθ is set as it is as phase difference dθA, and when magnitude of phase difference dθ is smaller than the prescribed value, small phase difference dθA reverse in polarity to phase difference dθ is generated and frequency fc of clock signal CLK3 is controlled to set phase difference dθA to 0 degree. Therefore, fluctuation of frequency fc of clock signal CLK3 can be prevented and phase information θ can quickly be synchronized with three-phase AC voltages VIu, VIv, and VIw.

It should be understood that the embodiment disclosed herein is illustrative and non-restrictive in every respect. The present invention is defined by the terms of the claims, rather than the description above, and is intended to include any modifications within the scope and meaning equivalent to the terms of the claims.

REFERENCE SIGNS LIST

T1 input terminal; T2 output terminal; T3 battery terminal; B1 to B4 breaker; 1 high-speed switch; 2 transformer; 3 bidirectional converter; 4 control device; 11 to 13 voltage detector; 14 to 16 A/D converter; 17 data bus; 18 memory; 19 oscillator; 20 rate multiplier; 21 counter; 22 clock generator; 23 CPU; 24 PWM circuit; 25 driver; 30 synchronization control circuit; 31 phase generator; 32 coordinate transformer; 33 calculator; 34 determination unit; 35 phase corrector; 36, 41 controller; 40 failure detector

The invention claimed is:

1. A synchronization control circuit that generates phase information in phase with a three-phase AC signal, the synchronization control circuit comprising:
a clock generator that generates a clock signal having a variable frequency;
a phase generator that advances the phase information by a predetermined angle in response to each pulse in the clock signal;
a coordinate transformer that transforms, in response to each pulse in the clock signal, the three-phase AC signal to a vector on rotational coordinates with the phase information being defined as a reference;
a calculator that calculates a first phase difference between the vector and a reference axis of the rotational coordinates;
a phase corrector that corrects the first phase difference to generate a second phase difference,
when magnitude of the first phase difference is larger than a predetermined value, the phase corrector sets the first phase difference as it is as the second phase difference, and
when magnitude of the first phase difference is smaller than the predetermined value, the phase corrector generates the second phase difference in reverse polarity to the first phase difference; and
a controller that controls a frequency of the clock signal so as to eliminate the second phase difference.

2. The synchronization control circuit according to claim 1, wherein
when magnitude of the first phase difference is smaller than the predetermined value, the phase corrector generates the second phase difference by subtracting from the first phase difference of a first vector generated in response to a present pulse, the first phase difference of a second vector generated in response to a previous pulse.

3. The synchronization control circuit according to claim 2, further comprising a determination unit that determines in which quadrant of a Ist quadrant, a IInd quadrant, a IIIrd quadrant, and a IVth quadrant of the rotational coordinates the vector is located, wherein
the phase corrector determines whether the first vector is advanced or delayed in phase based on comparison between the first and second vectors,
when the first vector is advanced in phase and the first vector is located in the Ist quadrant, the phase corrector generates the second phase difference by subtracting the first phase difference of the second vector from the first phase difference of the first vector,
when the first vector is advanced in phase and the first vector is located in the IVth quadrant, the phase corrector sets the first phase difference as it is as the second phase difference,
when the first vector is delayed in phase and the first vector is located in the IVth quadrant, the phase corrector generates the second phase difference by subtracting the first phase difference of the second vector from the first phase difference of the first vector, and
when the first vector is delayed in phase and the first vector is located in the Ist quadrant, the phase corrector sets the first phase difference as it is as the second phase difference.

4. The synchronization control circuit according to claim 3, wherein
when the first vector is advanced in phase and the first vector is located in the IInd quadrant, the phase corrector sets a positive restriction value as the second phase difference, and
when the first vector is delayed in phase and the first vector is located in the IIIrd quadrant, the phase corrector sets a negative restriction value as the second phase difference.

5. The synchronization control circuit according to claim 3, wherein
the Ist quadrant is divided into a plurality of first subquadrants and the IVth quadrant is divided into a plurality of second subquadrants,
the determination unit further determines in which subquadrant of the plurality of first subquadrants and the plurality of second subquadrants the vector is located,
when the first vector is located in any of the plurality of first subquadrants and the second vector is located in a first subquadrant or a second subquadrant on a clockwise side of the first vector, the phase corrector determines that the first vector is advanced in phase, and
when the first vector is located in any of the plurality of second subquadrants and the second vector is located in a first subquadrant or a second subquadrant on a counterclockwise side of the first vector, the phase corrector determines that the first vector is delayed in phase.

6. The synchronization control circuit according to claim 1, wherein
the clock generator includes
an oscillator that generates a first sub clock signal having a constant frequency,
a rate multiplier that divides the first sub clock signal to generate a second sub clock signal, a frequency division ratio of which being variably controlled, and
an up-down counter that counts pulses in the second sub clock signal and generates the clock signal by providing a pulse each time a count value reaches a maximum value and a minimum value, and
the controller controls the frequency of the clock signal by controlling the frequency division ratio of the rate multiplier.

7. The synchronization control circuit according to claim 1, wherein
the controller controls the frequency of the clock signal based on the second phase difference and an integral of the second phase difference.

8. An uninterruptible power supply apparatus comprising:
the synchronization control circuit according to claim 1;
a switch connected between an AC power supply and a load, the switch being turned on when the AC power supply is normal and turned off when the AC power supply fails;
a bidirectional converter that converts, when the AC power supply is normal, three-phase AC power supplied from the AC power supply through the switch to DC power so that the DC power is stored in a power storage device, and converts, when the AC power supply fails, DC power in the power storage device to three-phase AC power so that the three-phase AC power is supplied to the load; and
a control device that controls the bidirectional converter based on the phase information, wherein
the three-phase AC signal is a three-phase AC voltage supplied from the AC power supply.

* * * * *